United States Patent
Yang et al.

(10) Patent No.: US 9,246,361 B2
(45) Date of Patent: Jan. 26, 2016

(54) SEGMENTED MAGNETO-CONDUCTIVE STRUCTURE APPLIED IN ROTATING MACHINES

(75) Inventors: Chun-Chung Yang, Hsinchu (TW); Shou-Long Yu, Taoyuan County (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 969 days.

(21) Appl. No.: 13/437,744

(22) Filed: Apr. 2, 2012

(65) Prior Publication Data

US 2013/0119816 A1  May 16, 2013

(30) Foreign Application Priority Data

Nov. 11, 2011 (TW) .............................. 100141274 A

(51) Int. Cl.
*H02K 1/14* (2006.01)
*H02K 1/24* (2006.01)
*H02K 1/02* (2006.01)

(52) U.S. Cl.
CPC .................. *H02K 1/148* (2013.01); *H02K 1/24* (2013.01); *H02K 1/02* (2013.01)

(58) Field of Classification Search
CPC ................................. H02K 1/148; H02K 1/24
USPC .................. 310/106, 168, 216.075, 216.107, 310/216.049, 216.051
See application file for complete search history.

(56) References Cited

U.S. PATENT DOCUMENTS

| 887,521 | A | * | 5/1908 | Reist ...................... 310/216.088 |
| 5,729,072 | A | | 3/1998 | Hirano et al. |
| 7,012,350 | B2 | | 3/2006 | Peachee et al. |
| 7,345,397 | B2 | | 3/2008 | Sheeran et al. |
| 2001/0030486 | A1 | | 10/2001 | Pijanowski |
| 2008/0036311 | A1 | * | 2/2008 | Yamamoto et al. ............. 310/42 |
| 2008/0054751 | A1 | * | 3/2008 | Hoshino et al. ............... 310/216 |
| 2010/0138127 | A1 | * | 6/2010 | Boughtwood .................. 701/71 |

FOREIGN PATENT DOCUMENTS

| CN | 102007226 A | 4/2011 |
| CN | 201904662 U | 7/2011 |
| TW | 446164 | 7/2001 |
| TW | 200405638 | 4/2004 |

(Continued)

OTHER PUBLICATIONS

Intellectual Property Office, Ministry of Economic Affairs, R.O.C., "Office Action", Dec. 12, 2013, Taiwan.

(Continued)

*Primary Examiner* — Terrance Kenerly
(74) *Attorney, Agent, or Firm* — Locke Lord LLP; Tim Tingkang Xia, Esq.

(57) ABSTRACT

A segmented magneto-conductive structure applied in rotating machines comprises a rotor assembly and a stator assembly. The rotor assembly includes a rotor yoke component and a plurality of rotor teeth components. The rotor yoke component is made of non-oriented silicon steel. The rotor teeth components are made of grain-oriented silicon steel. The stator assembly includes a plurality of stator yoke components and a plurality of stator teeth components. The stator yoke components and the stator teeth components are made of grain-oriented silicon steel. Thereby, an operational efficiency of a motor applying the segmented magneto-conductive structure is enhanced.

12 Claims, 6 Drawing Sheets

(56) References Cited

FOREIGN PATENT DOCUMENTS

| TW | 200412706 | 7/2004 |
|---|---|---|
| TW | I234332 | 6/2005 |
| TW | I283098 | 6/2007 |

OTHER PUBLICATIONS

Yoshiyuki Ishihara, recent topic about electronic magnetic material, ShangHaiGanYan (ShangHai steel research), 2000, p. 5-8, episode 3.

State Intellectual Property Office of the People's Republic of China, "Office Action", China, Aug. 5, 2014.

Low et al., Analysis and Comparison of Switched Reluctance Motors With Different Physical Sizes Using A 2D Finite Element Method, IEEE Transactions on Magnetics, 1995, vol. 31, No. 6, pp. 3503-3505.

Lovatt et al., Comparative Performance of Singly Salient Reluctance, Switched Reluctance, and Induction Motors, IEEE Conf. Pub., 1997, vol. 1997, Issue CP No. 444, pp. 361-365.

Harris et al., Comparison of Design and Performance Parameters in Switched Reluctance and Induction Motors, Fourth INternational Conference on Electrical Machines and Drives, 1999, pp. 303-307.

Silveira et al., Control of the SRM Operating as a Motor/Generator, IEEE International Symposium on Industrial Electronics, 2009, pp. 1558-1563.

Sun et al., Design and Simulation of a Linear Switched Reluctance Generator for Wave Energy Conversion, 4th Internaiontal Conference on Power Electronics Systems and Applications (PESA), 2011, pp. 1-5.

Chen et al., Implementation of a Three-Phase Switched Reluctance Generator System for Wind Power Applications, 14th Symposium on Elcetromagnetic Launch Techonology, 2008, pp. 1-6.

Chang, et al., On the Design of Power Circuit and Control Scheme for Switched Reluctance Generator, IEEE Transactions on Power Electronics, 2008, vol. 23, No. 1, pp. 445-454.

Bao et al., Research on a Novel Switched Reluctance Generator for Wind Power Generation, 2011 4th Internaiontal Conference on Power Electronics Systems and Applications (PESA), 2011, pp. 1-6.

Ogawa et al., Study for Small Size Wind Power Generating System Using Switched Reluctance Generator, ICIT 2006. IEEE International Conference on Industrial Techonology, 2006, pp. 1510-1515.

Murakami et al., The Performance Comparison of SPMSM, IPMSM and SynRM in Use as Air-conditioning Compressor, Conference Record of the 1999 IEEE Thirty-Fourth IAS Annual Meeting, Industry Application Conference, 1999, vol. 2, pp. 840-845.

State Intellectual Property Office of the People's Republic of China, "Office Action", Aug. 14, 2015, China.

* cited by examiner

US 9,246,361 B2

SEGMENTED MAGNETO-CONDUCTIVE STRUCTURE APPLIED IN ROTATING MACHINES

CROSS-REFERENCE TO RELATED APPLICATIONS

This non-provisional application claims priority under 35 U.S.C. §119(a) on Patent Application No(s). 100141274 filed in Taiwan, R.O.C. on Nov. 11, 2011, the entire contents of which are hereby incorporated by reference.

BACKGROUND

1. Technical Field

The present disclosure relates to a segmented magneto-conductive structure applied in rotating machines and more particularly to a segmented magneto-conductive structure employing grain-oriented silicon steel.

2. Related Art

Facing the cruel fact of the shortage of petrochemical energy globally, every major industrial country is especially taking the matters of energy development and control of energy consumption very seriously. Take home appliances as an example, energy consumed by indoors air conditioning, refrigerators, heat pumps of hot water systems and fans is amounted to approximately over 40% of a total household power consumption. As for the commercial and industrial fields, energy consumed by electrical machinery and equipments of air compressors, vacuum pumps, water pumps, transmission machinery, central air conditioning, fans, refrigerators, freezers and heat pumps is amounted to approximately over 70% of a total power consumption. Therefore, seeking improvements on the efficiency and the ways of using various electrical machinery and equipments are the directions which countries worldwide are working on for the purposes of energy-saving and carbon emissions reduction.

Therefore, if the efficiency of motors of electrical machinery and equipments can be enhanced, electrical power consumption can be saved substantially. In order to enhance the efficiency of motors of electrical machinery and equipments, highly energy efficient permanent magnetic motor of rare-earth permanent magnet of high energy product is introduced into the market, and a permanent magnetic motor employing rare-earth permanent magnets has a lower energy loss rate than a common motor. However, about 97% of the production capacity of rare-earth permanent magnets comes from China, and therefore the unbalanced supply and demand of rare-earth materials causes the price hike. As a result, applications of permanent magnetic motors are affected and prices of electrical products and equipments driven by permanent magnetic motors also increase.

In view of the abovementioned, it is a problem for manufacturers worldwide who require rare-earth permanent magnets to develop highly energy efficient equipments and products. Therefore, every electrical machinery products manufacturer is in search for alternative technologies for replacing rare-earth permanent magnets.

SUMMARY

A segmented magneto-conductive structure applied in rotating machines of the disclosure comprises a rotor assembly and a stator assembly. The rotor assembly includes a rotor yoke component and a plurality of rotor teeth components. The rotor yoke component is made of non-oriented silicon steel. The rotor teeth components are made of grain-oriented silicon steel. The rotor teeth components are surroundingly disposed on the rotor yoke component, and are extended along a radial direction of the rotor yoke component. The stator assembly includes a plurality of stator yoke components and a plurality of stator teeth components. The stator yoke components are made of grain-oriented silicon steel, and the stator yoke components are disposed around the rotor assembly along a rotational direction of the rotor yoke component. The stator teeth components are made of grain-oriented silicon steel, and each of the stator teeth components is disposed between two of the adjacent stator yoke components respectively and they are also disposed around the rotor assembly. The stator teeth components are extended toward the rotor assembly along a radial direction, and are corresponding to the rotor teeth components.

The present invention will become more fully understood by reference to the following detailed description thereof when read in conjunction with the attached drawings.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
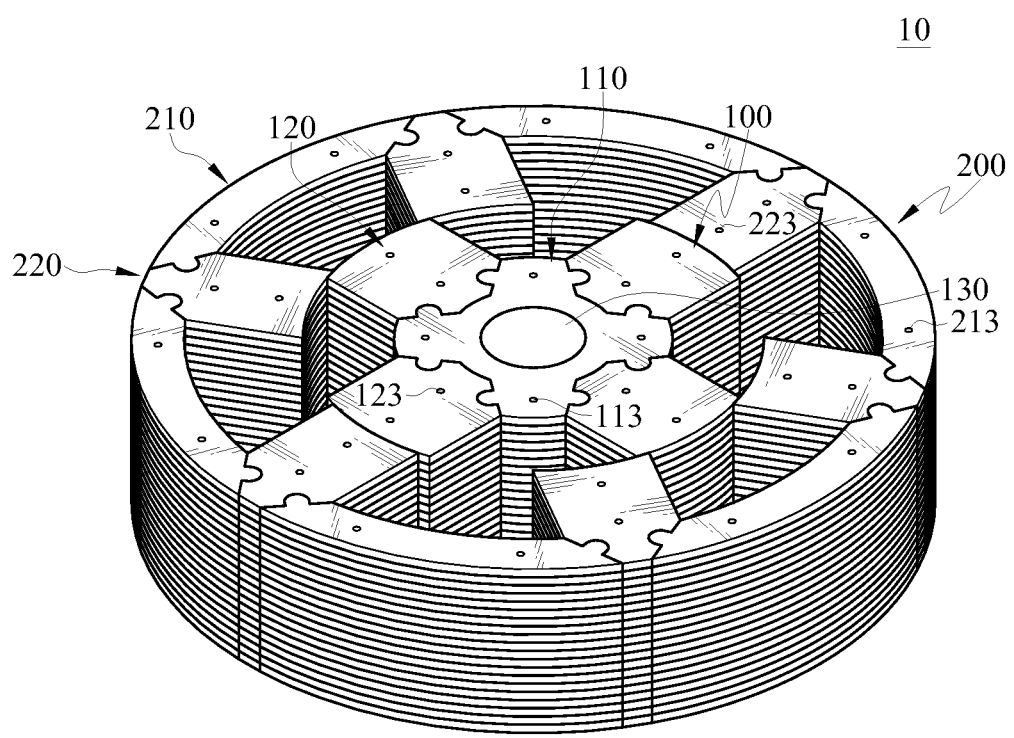
FIG. 1 is a perspective structural view of a segmented magneto-conductive structure of an embodiment according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Some embodiments of the disclosure provides a segmented magneto-conductive structure for applying in rotating machines in order to enhance an operational efficiency of rotating machines so as to achieve the purposes of energy-saving and better economic effectiveness.

Figure 2:
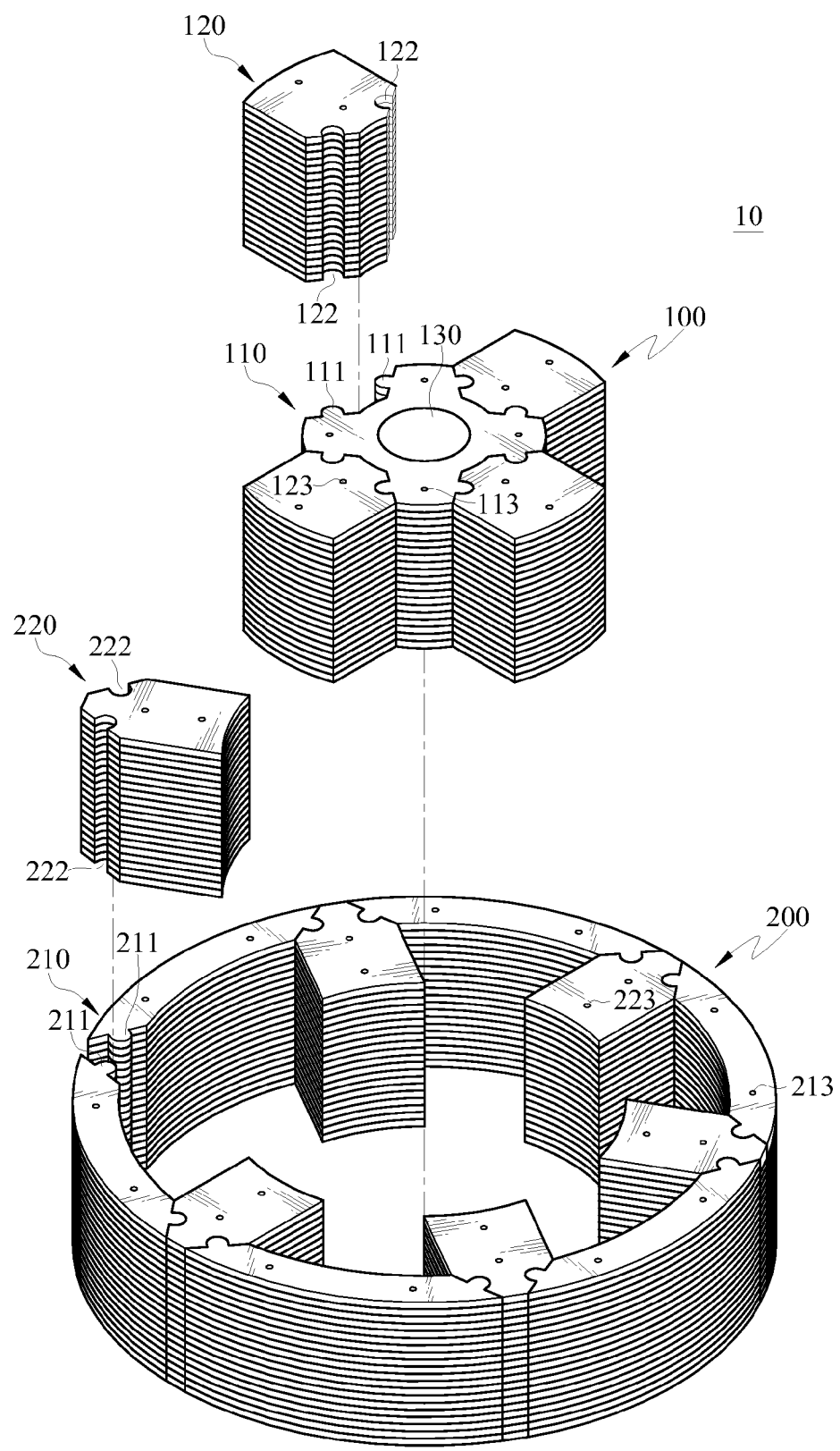
FIG. 2 is an exploded perspective view of a segmented magneto-conductive structure of an embodiment according to the disclosure.
Figure 3:
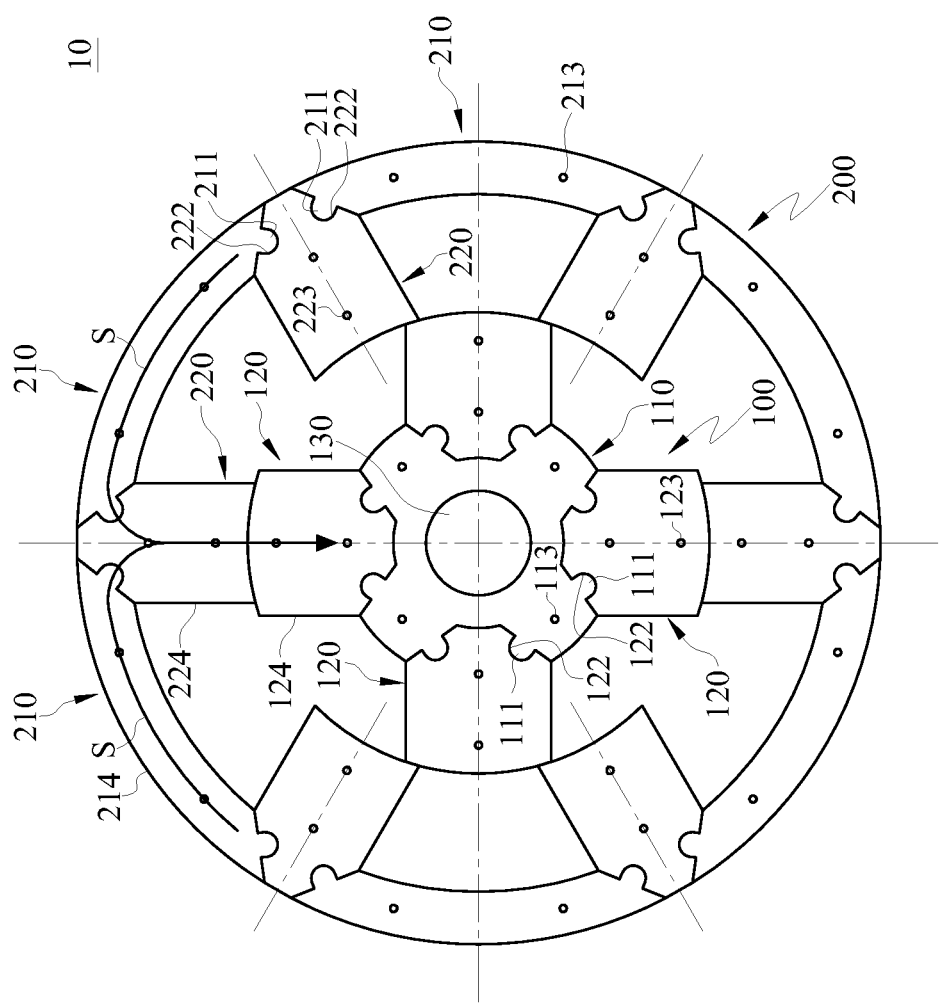
FIG. 3 is a top view of a segmented magneto-conductive structure of an embodiment according to the disclosure.

Referring to FIGS. 1, 2 and 3, FIG. 1 is a perspective structural view of a segmented magneto-conductive structure of an embodiment according to the disclosure, FIG. 2 is an exploded perspective view of a segmented magneto-conductive structure of an embodiment according to the disclosure, FIG. 3 is a top view of a segmented magneto-conductive structure of an embodiment according to the disclosure.

A segmented magneto-conductive structure of the disclosure is applicable for use in common rotating machines. A segmented magneto-conductive structure 10 in the drawings is applied in common motor structures in order to enhance the operational efficiency of motors. The segmented magneto-conductive structure 10 comprises a rotor assembly 100 and a stator assembly 200. The rotor assembly 10 includes a rotor yoke component 110 and a plurality of rotor teeth components 120. The rotor yoke component 110 is connected with a rotor shaft 130, the rotor yoke component 110 rotates around an axis of the rotor shaft 130. The rotor yoke component 110 is made of non-oriented/isotropic silicon steel. Furthermore, the rotor teeth components 120 are made of grain-oriented/anisotropic silicon steel, the rotor teeth components 120 surround the rotor yoke component 110, and are extended outwardly in a radial direction of the rotor yoke component 110. Each of the rotor teeth components 120 can be further cooperated with a coil to generate magnetic force, so that the rotor assembly 100 can have a plurality of magnetic pole pairs.

The stator assembly 200 of this embodiment includes a plurality of stator yoke components 210 and a plurality of stator teeth components 220. The stator yoke components 210 are made of grain-oriented silicon steel, and are disposed around the rotor assembly 100 in a rotational direction of the rotor yoke component 110. The stator teeth components 220 are made of grain-oriented silicon steel, and each of the stator teeth components 220 is disposed between two of the immediately adjacent stator yoke components 210 respectively and they are also disposed around the rotor assembly 100. Furthermore, the stator teeth components 220 are extended toward the rotor assembly 100 in a radial direction of the rotor yoke component 110, and are corresponding to the rotor teeth components 120. More specifically, two of the adjacent stator yoke components 210 are connected with two opposite sides of the corresponding stator teeth component 220 respectively, so that the corresponding stator teeth component 220 is dispose between two of the adjacent stator yoke components 210. In like manner, two of the adjacent stator teeth components 220 are connected with two opposite sides of the corresponding stator yoke component 210 respectively, so that the corresponding stator yoke component 210 is dispose between two of the adjacent stator teeth components 220. That means the stator teeth components 220 and the stator yoke components 210 are disposed alternately. Each of the stator teeth components 220 can be further cooperated with a coil to generate magnetic force, so that the stator assembly 200 can have a plurality of magnetic pole pairs corresponding to the rotor teeth components 120 of the rotor assembly 100. Accordingly, with appropriate electric current inputted in the coil, the stator assembly 200 can generate magnetic pole pairs corresponding to the rotor assembly 100, so that the rotor assembly 100 can rotate relative to the stator assembly 200. Because a control method for motor running is not an emphasis of the disclosure, it will not be mentioned herein.

The abovementioned grain-oriented silicon steel has specific arrangement direction of crystals, and the grain-oriented silicon steel features excellent magneto-conductivity in its arrangement direction of crystals; therefore, in comparing with common non-oriented silicon steel, the grain-oriented silicon steel has the characteristics of low coercivity and low core loss. More specifically, the arrangement direction of crystals of the grain-oriented silicon steel is the same as its calendaring direction during a calendaring process. Therefore, when a magnetic field line passes through the grain-oriented silicon steel, if a direction of the magnetic field line is the same as the calendaring direction of the grain-oriented silicon steel, then the core loss generated by the magnetic field line passing through the grain-oriented silicon steel is a lot lower than the core loss generated by the magnetic field line passing through the conventional non-oriented silicon steel. In contrast, when the magnetic field line passes through the grain-oriented silicon steel, if a direction of the magnetic field line is substantially vertical to the calendaring direction of the grain-oriented silicon steel, then the core loss generated by the magnetic field line passing through the grain-oriented silicon steel is higher than the core loss generated by the magnetic field line passing through the conventional non-oriented silicon steel. More specifically, the more identical is the direction of the magnetic field line to the calendaring direction of the grain-oriented silicon steel, the lower is the core loss generated by the magnetic field line passing through the grain-oriented silicon steel.

Therefore, if the calendaring direction of the grain-oriented silicon steel employed by the rotor teeth components 120, the stator teeth components 220 and the stator yoke components 210 is selected appropriately, the segmented magneto-conductive structure 10 of the disclosure will have low coercivity and low core loss.

Figure 4A:
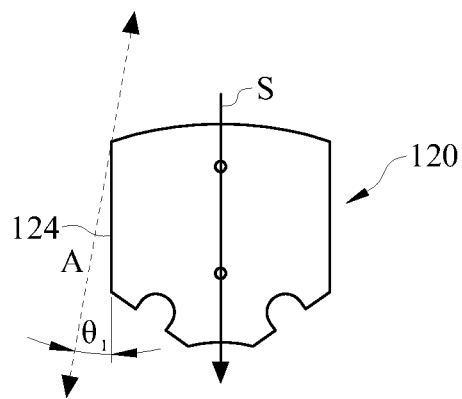
FIGS. 4A to 4C are partial enlarged views of structures of FIG. 3.
Figure 4B:
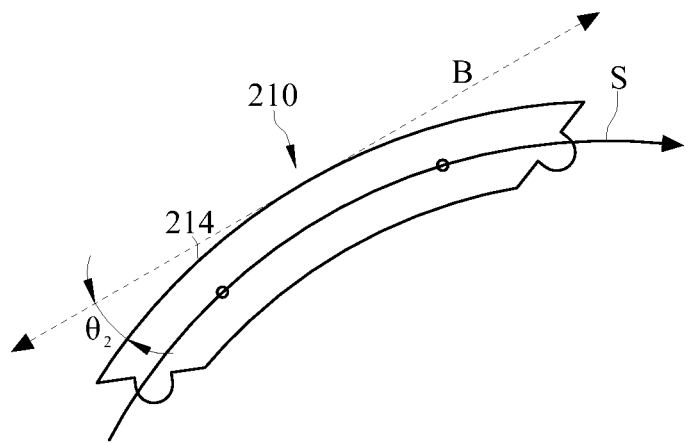
Figure 4C:
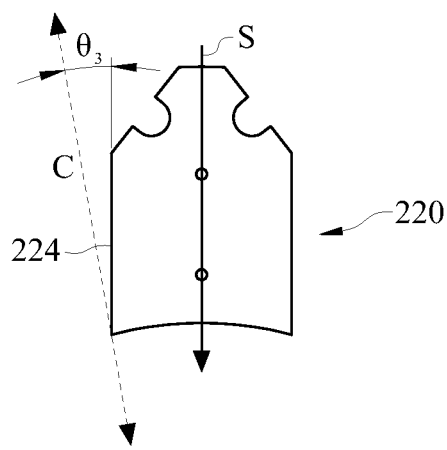

Referring to FIGS. 2 and 3 in conjunction with FIGS. 4A to 4C, in this embodiment or other embodiments, the rotor yoke component 110 includes a plurality of stacked non-oriented silicon steel sheets, the rotor teeth component 120 includes a plurality of stacked grain-oriented silicon steel sheets, the stator yoke component 210 includes a plurality of stacked grain-oriented silicon steel sheets, and the stator teeth component 220 includes a plurality of stacked grain-oriented silicon steel sheets as shown in FIG. 2.

An included angle $\theta1$ between a calendaring direction A of each of the grain-oriented silicon steel sheets of the rotor teeth component 120 and a long side 124 of the rotor teeth component 120 extended in a radial direction is smaller than or equal to 15 degrees as shown in FIG. 4A. An included angle $\theta2$ between a calendaring direction B of each of the grain-oriented silicon steel sheets of the stator yoke component 210 and a long side 214 of the stator yoke component 210 extended in a rotational direction is smaller than or equal to 15 degrees as shown in FIG. 4B. An included angle $\theta3$ between a calendaring direction C of each of the grain-oriented silicon steel sheets of the stator teeth component 220 and a long side 224 of the stator teeth component 220 extended in a radial direction is smaller than or equal to 15 degrees as shown in FIG. 4C. Because a magnetic field line S passes through the stator yoke component 210 along a rotational direction of the rotor yoke component 110, and passes through the rotor teeth component 120 and the stator teeth component 220 along a radial direction of the rotor yoke component 110 as shown in FIG. 3; thus by dispositions of the calendaring directions of the grain-oriented silicon steel sheets of the rotor teeth component 120, the stator yoke component 210 and the stator teeth component 220, the included angles between the magnetic field line S and the calendaring direction A of the grain-oriented silicon steel sheets of the rotor teeth component 120, the calendaring direction B of the grain-oriented silicon steel sheets of the stator yoke component 210 and the calendaring direction C of the grain-oriented silicon steel sheets of the stator teeth component 220 can be controlled to be smaller than or equal to 15 degrees. Thereby, when the magnetic field line S passes through the rotor teeth component 120, the stator yoke component 210 and the stator teeth component 220, a core loss value of the rotor teeth component 120, the stator yoke component 210 and the stator teeth component 220 can be smaller than 1.5 W/kg. In comparing with a core loss value of over 2.5~13 W/kg of a common motor employing non-oriented silicon steel sheets, the segmented magneto-conductive structure 10 of this embodiment can enhance the operational efficiency of the motor by lowering the core loss. Furthermore, the operational efficiency of the segmented magneto-conductive structure of this embodiment can be closed to a standard of highly energy efficient permanent magnetic motor without employing rare-earth permanent magnets of high energy product, and therefore the product costs can be reduced substantially.

Furthermore, in this embodiment or other embodiments, the rotor yoke component 110 has a plurality of protruded structures 111, each of the rotor teeth components 120 has an indented structure 122 disposed on its two opposite sides respectively, and the protruded structures 111 are coupled with the indented structures 122, so that the rotor yoke component 110 and the rotor teeth components 120 are jointed together by self-riveting.

Furthermore, in this embodiment or other embodiments, each of the stator yoke components 210 has a protruded structure 211 disposed on its two opposite sides respectively, each of the stator teeth components 220 has an indented structure 222 disposed on its two opposite sides respectively, and the protruded structures 211 are coupled with the indented structures 222, so that the stator yoke components 210 and the stator teeth components 220 can be riveted together.

It should be noted that, the abovementioned structures of coupling of the rotor yoke component 110 and the rotor teeth components 120 and the structures of coupling of the stator yoke components 210 and the stator teeth components 220 are achieved by interference fit between the corresponding structures, so that the problem with core loss caused by connecting interfaces can be reduced.

Furthermore, the non-oriented silicon steel sheets of the rotor yoke component 110 can be riveted together in one stack by using a plurality of riveting points 113, the grain-oriented silicon steel sheets of the rotor teeth component 120 can be riveted together in one stack by using a plurality of riveting points 123, the grain-oriented silicon steel sheets of the stator yoke components 210 can be riveted together in one stack by using a plurality of riveting points 213, and the grain-oriented silicon steel sheets of the stator teeth components 220 can be riveted together in one stack by using a plurality of riveting points 223. By employing the abovementioned riveting and fixing method, the structures of coupling can be simplified substantially in order to enhance the mass productivity.

More specifically, when the segmented magneto-conductive structure 10 of the disclosure is manufactured and assembled, the non-oriented silicon steel sheets of the rotor yoke component 110, the grain-oriented silicon steel sheets of the rotor teeth component 120, the grain-oriented silicon steel sheets of the stator yoke components 210 and the grain-oriented silicon steel sheets of the stator teeth components 220 can be arranged sequentially, and then the indented structures and the protruded structures are riveted together by fixtures, so that the segmented magneto-conductive structure 10 in one single layer unit is formed. Afterwards, the layer units of the segmented magneto-conductive structure 10 are stacked together sequentially until reaching an expected thickness, and then each of the layer units of the segmented magneto-conductive structure 10 is riveted with each other to complete the assembling process. It should be noted that, the abovementioned assembling method is only one of the feasible assembling methods, it should not be construed as a limitation to the disclosure, and any person with skills in the art can adjust the sequence and method of assembling according to practical requirements.

Figure 5:
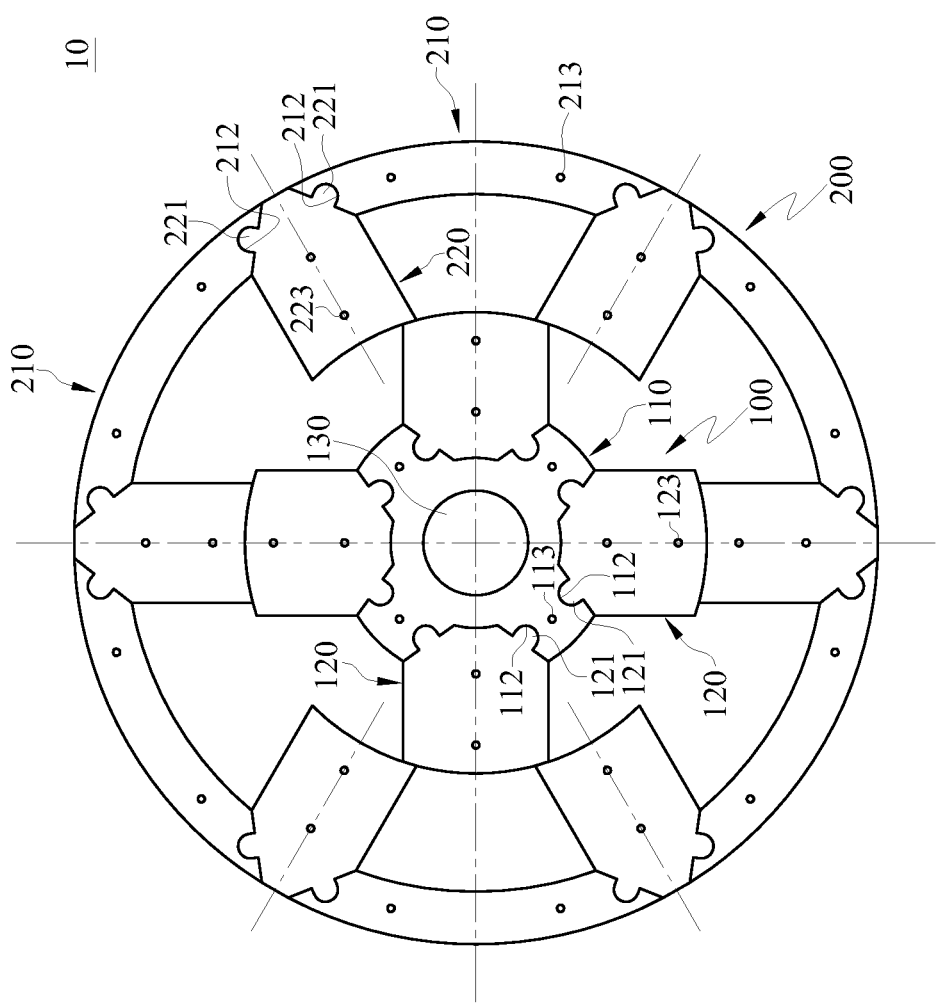
FIG. 5 is a top view of a segmented magneto-conductive structure of another embodiment according to the disclosure.

FIG. 5 is a top view of a segmented magneto-conductive structure of another embodiment according to the disclosure. Because this embodiment is similar to the embodiment in FIG. 3, only the differences between them are described below.

In this embodiment, the rotor yoke component 110 has a plurality of indented structures 112, each of the rotor teeth components 120 has a protruded structure 121 disposed on its two opposite sides respectively, and the protruded structures 121 are coupled with the indented structures 112, so that the rotor yoke component 110 and the rotor teeth components 120 are jointed together.

Furthermore, each of the stator yoke components 210 has an indented structure 212 disposed on its two opposite sides respectively, each of the stator teeth components 220 has a protruded structure 221 disposed on its two opposite sides respectively, and the protruded structures 221 are riveted with the indented structures 212, so that the stator yoke components 210 and the stator teeth components 220 can be jointed together.

Figure 6:
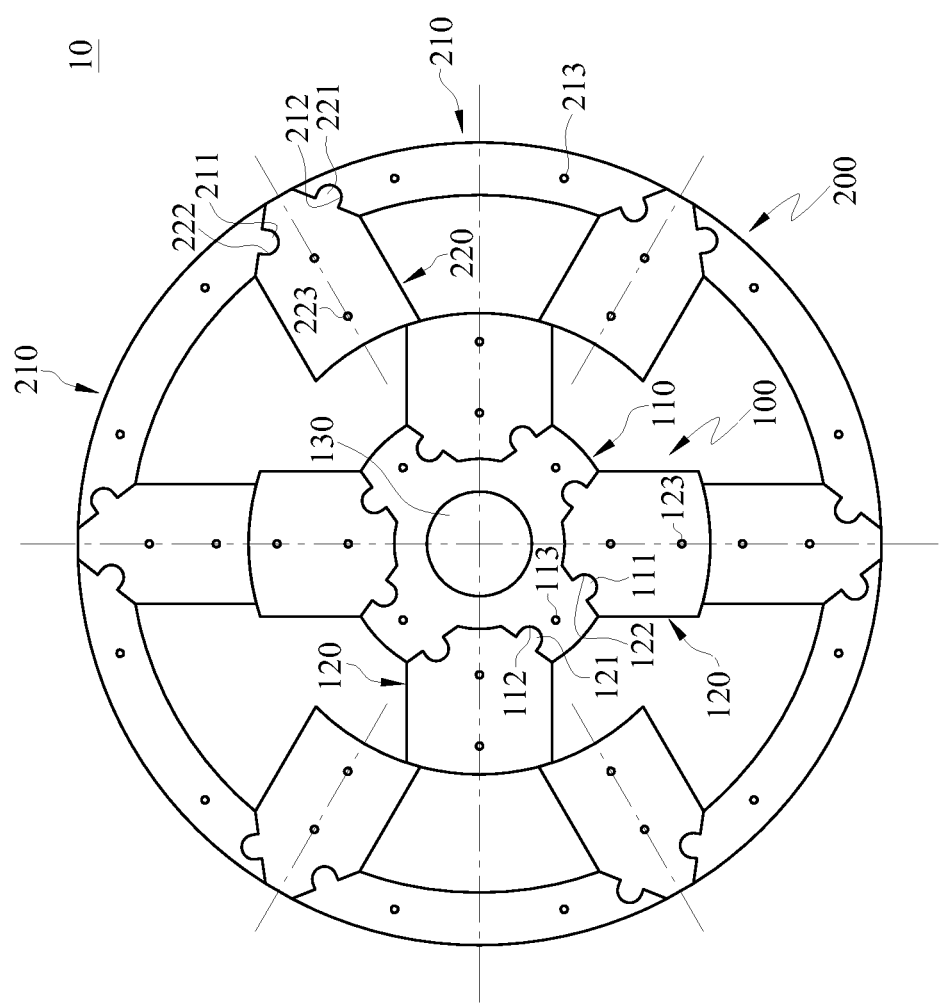
FIG. 6 is a top view of a segmented magneto-conductive structure of another embodiment according to the disclosure.

FIG. 6 is a top view of a segmented magneto-conductive structure of another embodiment according to the disclosure. Because this embodiment is similar to the embodiment in FIG. 3, only the differences between them are described below.

In this embodiment, the rotor yoke component 110 has a plurality of indented structures 112 and protruded structures 111, each of the rotor teeth components 120 has a protruded structure 121 and an indented structure 122 disposed on its two opposite sides respectively, the protruded structures 121 are coupled with the indented structures 112, and the protruded structures 111 are coupled with the indented structures 122, so that the rotor yoke component 110 and the rotor teeth components 120 are jointed together.

Furthermore, each of the stator yoke components 210 has an indented structure 212 and a protruded structure 211 disposed on its two opposite sides respectively, each of the stator teeth components 220 has a protruded structure 221 and an indented structure 222 disposed on its two opposite sides respectively, the protruded structures 221 are coupled with the indented structures 212, and the protruded structures 211 are coupled with the indented structures 222, so that the stator yoke components 210 and the stator teeth components 220 can be jointed together.

According to the segmented magneto-conductive structure of the abovementioned embodiments, the rotor assembly is divided into the rotor yoke component and the rotor teeth components, the stator assembly is divided into the stator yoke components and the stator teeth components. Furthermore, the rotor yoke component is made of non-oriented silicon steel, while the rotor teeth components, the stator yoke components and the stator teeth components are made of grain-oriented silicon steel. By such structural dispositions and materials employed, even without employing rare-earth permanent magnets of high energy product, both the coercivity and the core loss of the segmented magneto-conductive structure are low, and therefore the operational efficiency of the motor employing the segmented magneto-conductive structure is enhanced.

Furthermore, by having the design of the included angle between the calendaring direction of each of the grain-oriented silicon steel sheets of the rotor teeth component and the long side of the rotor teeth component extended along the radial direction smaller than or equal to 15 degrees, the included angle between the calendaring direction of each of the grain-oriented silicon steel sheets of the stator yoke component and the long side of the stator yoke component extended in the rotational direction smaller than or equal to 15 degrees, and the included angle between the calendaring direction of each of the grain-oriented silicon steel sheets of the stator teeth component and the long side of the stator teeth component extended in the radial direction smaller than or equal to 15 degrees, so that a core loss value of the segmented magneto-conductive structure can be reduced to under 1.5 W/kg in order to enhance the operational efficiency of the rotating machine.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A segmented magneto-conductive structure applied in rotating machines, comprising:
   a rotor assembly, comprising:
      a rotor yoke component made of non-oriented silicon steel; and
      a plurality of rotor teeth components made of grain-oriented silicon steel, the rotor teeth components surrounding the rotor yoke component, and extending in a radial direction of the rotor yoke component; and
   a stator assembly, comprising:
      a plurality of stator yoke components made of grain-oriented silicon steel, the stator yoke components being disposed around the rotor assembly in a rotational direction of the rotor yoke component, wherein each of the stator yoke components includes a plurality of stacked grain-oriented silicon steel sheets, and an included angle between a calendaring direction of each of the grain-oriented silicon steel sheets and a long side of the stator yoke component extended in the rotational direction is smaller than or equal to 15 degrees; and
      a plurality of stator teeth components made of grain-oriented silicon steel, each of the stator teeth components being disposed between two of the adjacent stator yoke components respectively and being disposed around the rotor assembly, and the stator teeth components extending toward the rotor assembly in the radial direction, and being corresponding to the rotor teeth components.

2. The segmented magneto-conductive structure applied in rotating machines as claimed in claim 1, wherein the rotor yoke component comprises a plurality of stacked non-oriented silicon steel sheets.

3. The segmented magneto-conductive structure applied in rotating machines as claimed in claim 2, wherein the non-oriented silicon steel sheets are riveted together.

4. The segmented magneto-conductive structure applied in rotating machines as claimed in claim 1, wherein each of the rotor teeth components comprises a plurality of stacked grain-oriented silicon steel sheets, and an included angle between a calendaring direction of each of the grain-oriented silicon steel sheets and a long side of the rotor teeth component extended in the radial direction is smaller than or equal to 15 degrees.

5. The segmented magneto-conductive structure applied in rotating machines as claimed in claim 4, wherein the grain-oriented silicon steel sheets are riveted together.

6. The segmented magneto-conductive structure applied in rotating machines as claimed in claim 1, wherein the grain-oriented silicon steel sheets are riveted together.

7. The segmented magneto-conductive structure applied in rotating machines as claimed in claim 1, wherein each of the stator teeth components includes a plurality of stacked grain-oriented silicon steel sheets, and an included angle between a calendaring direction of each of the grain-oriented silicon steel sheets and a long side of the stator teeth component extended along the radial direction is smaller than or equal to 15 degrees.

8. The segmented magneto-conductive structure applied in rotating machines as claimed in claim 7, wherein the grain-oriented silicon steel sheets are riveted together.

9. The segmented magneto-conductive structure applied in rotating machines as claimed in claim 1, wherein the rotor yoke component has a protruded structure, at least one of the rotor teeth components has an indented structure, the protruded structure is coupled with the indented structure for connecting the rotor yoke component to the rotor teeth component.

10. The segmented magneto-conductive structure applied in rotating machines as claimed in claim 1, wherein at least one of the stator yoke components has a protruded structure, at least one of the stator teeth components has an indented structure, the protruded structure is coupled with the indented structure for connecting the stator yoke component to the stator teeth component.

11. The segmented magneto-conductive structure applied in rotating machines as claimed in claim 1, wherein the rotor yoke component has an indented structure, at least one of the rotor teeth components has a protruded structure, the protruded structure is coupled with the indented structure for connecting the rotor yoke component to the rotor teeth component.

12. The segmented magneto-conductive structure applied in rotating machines as claimed in claim 1, wherein at least one of the stator yoke components has an indented structure, at least one of the stator teeth components has a protruded structure, the protruded structure is coupled with the indented structure for connecting the stator yoke component to the stator teeth component.

* * * * *